United States Patent [19]

Arenas

[11] Patent Number: 4,498,526
[45] Date of Patent: Feb. 12, 1985

[54] SOLAR EFFICIENT STRUCTURE

[76] Inventor: Frank B. Arenas, 5303 W. Kennedy, Tampa, Fla. 33609

[21] Appl. No.: 430,965

[22] Filed: Sep. 30, 1982

Related U.S. Application Data

[63] Continuation-in-part of Ser. No. 319,789, Nov. 9, 1981.

[51] Int. Cl.³ .............................. F28D 1/00; F24J 3/02
[52] U.S. Cl. .................... 165/45; 165/48 R; 165/48 S; 126/429
[58] Field of Search ............... 126/428, 429, 430, 431; 165/45, 48 R, 48 S; 237/1 R; 52/743

[56] References Cited

U.S. PATENT DOCUMENTS

| | | | |
|---|---|---|---|
| 2,989,790 | 6/1961 | Brown | 52/743 |
| 3,619,437 | 11/1971 | McDonald | 52/743 |
| 3,980,127 | 9/1976 | Sacks | 165/16 X |
| 4,075,807 | 2/1978 | Alderman | 52/743 X |
| 4,128,204 | 12/1978 | Wade | 126/430 |
| 4,172,345 | 10/1979 | Alderman | 52/743 X |
| 4,181,118 | 1/1980 | Mummert | 126/429 |
| 4,192,454 | 3/1980 | Rugenstein | 126/429 X |
| 4,231,351 | 11/1980 | Pheils, Jr. | 126/429 X |
| 4,286,420 | 9/1981 | Pharmakidis | 126/430 X |
| 4,295,415 | 10/1981 | Schneider, Jr. | 126/428 X |
| 4,382,435 | 5/1983 | Brill-Edwards | 126/428 X |
| 4,404,959 | 9/1983 | Mondragon | 126/429 |

FOREIGN PATENT DOCUMENTS

| | | | |
|---|---|---|---|
| 2359196 | 6/1975 | Fed. Rep. of Germany | 126/431 |
| WO81/02320 | 8/1981 | PCT Int'l Appl. | 52/743 |

Primary Examiner—William R. Cline
Assistant Examiner—Edward P. Walker
Attorney, Agent, or Firm—Stefan Stein

[57] ABSTRACT

A solar efficient structure is disclosed which comprises a central chase positioned vertically within the structure and connected in fluid communication with a duct network positioned in thermal contact with the ground and with the attic of the structure. A fan is provided for circulating air through a perforated attic duct, through the various rooms of the structure, and through the duct network and the chase. In one embodiment, the fan is reversible so as to circulate the air in one direction, or in the other direction. When operating in the heating mode, the ground acts as a heat source to heat the air circulating through the duct network. Conversely, when operating in the cooling mode, the ground acts as a heat sink to cool the airflow circulating therethrough. A dehumidifier, and a heating or cooling means is provided for assisting in the conditioning of the circulating airflow. In one embodiment, the heating means comprises a greenhouse room which permits ultraviolet radiation to enter and heat the air contained therein, and a damper means for controlling the flow rate of the air circulating through the greenhouse room. The structure is fully insulated and includes a vent skin positioned about the exterior walls and the roof thereof. A method is disclosed for insulating the roof line with loose insulation.

24 Claims, 6 Drawing Figures

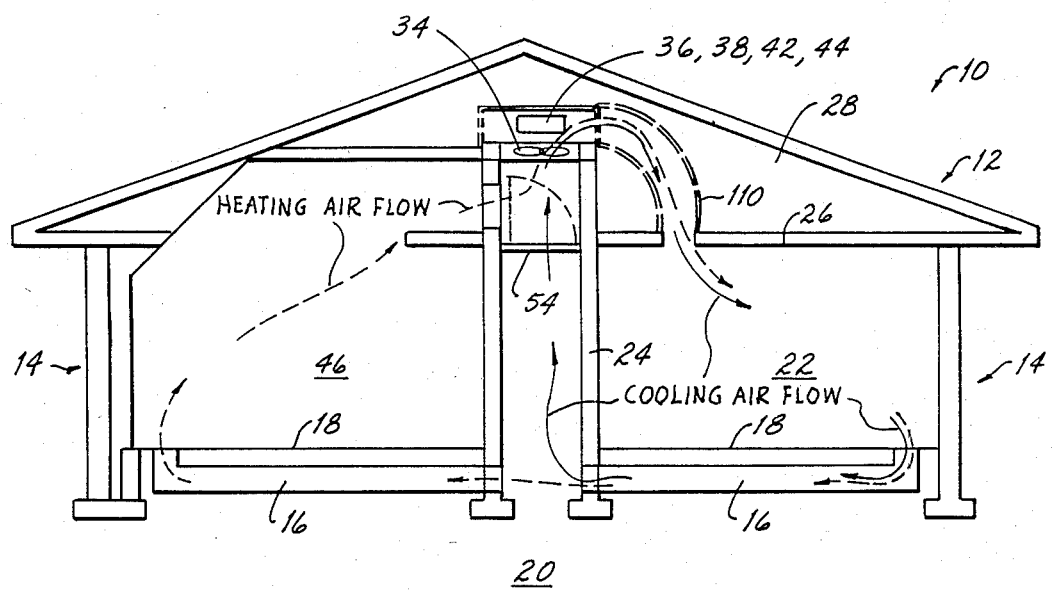

SOLAR EFFICIENT STRUCTURE

CROSS-REFERENCE TO RELATED APPLICATIONS

This application is a continuation in part of my copending application Ser. No. 319,789, filed Nov. 9, 1981 entitled "Solar Efficient Structure" the disclosure of which is hereby incorporated by reference herein.

BACKGROUND OF THE INVENTION

1. Field of the Invention

This invention relates to solar efficient structures such as homes which are designed to provide a comfortable environment therein throughout the year. More particularly, this invention relates to earth tempered structures including a greenhouse room for permitting ultraviolet radiation to enter and heat the air contained therein. This invention also relates to a novel method for insulating the roof line of the structure.

2. Description of the Prior Art

Presently, there exists a great need for solar efficient structures such as homes which are designed to maintain a comfortable living environment for the home owner and his family. Home owners have become increasingly aware of the total cost of maintaining their home at a comfortable living condition. This is primarily due to the ever increasing cost of energy. Most of the efforts in decreasing the energy cost to the consumer have been directed at providing more efficient heat pumps, air conditioners, and the like. Unfortunately, the savings in using these more efficient devices have been offset by the ever increasing cost of electrical energy necessary to power the devices.

One obvious solution to reduce the amount of energy required to maintain a comfortable living environment is to insulate the house from the outside environment. It is commonly found that the consumer merely insulates or adds insulation to the ceiling of the house, and yet fails to consider insulating the roof or the walls of the house. This results in a large amount of thermal energy being stored within the attic of the house during the day. After a period of time, usually four to five hours, this stored thermal energy conducts through the insulation in the ceiling and is radiated into the living quarters of the house. It should be obvious that the house must not only be cooled during daytime hours but also cooled at night because of the radiated thermal energy in the attic.

Therefore it is an object of this invention to provide an apparatus and method which overcomes the aforementioned inadequacies of the prior art devices and provides an improvement which is a significant contribution to the solar efficient structure art.

Another object of this invention is to provide a solar efficient structure including an earth tempered design which uses the ground as a heat sink in the summer months, and as a heat source during the winter months.

Another object of this invention is to provide a solar efficient structure having a plurality of ducts positioned below the slab of the structure so as to be in thermal contact with the ground and having the fan means for circulating air through the vents.

Another object of this invention is to provide a solar efficient structure including a greenhouse room which permits ultraviolet radiation to enter and heat the air contained therein and including fan means for circulating the heated air throughout the house.

Another object of this invention is to provide a solar efficient structure including a central chase which is connected in fluid communication with the vents positioned under the slab and with the attic such that the air is circulated through the vents, through the chase, and into the attic, or vice versa.

Another object of this invention is to provide a solar efficient structure including perforated duct means extending from the central chase to the individual rooms of the structure.

Another object of this invention is to provide a solar efficient structure in which the perforated duct includes a particular degree of porosity such that the attic is maintained at a cool temperature while the majority of the airflow from the central chase is directed into the individual rooms of the structure.

Another object of this invention is to provide a solar efficient structure including a damper means which controls the circulating airflow through the greenhouse room, thereby enabling the structure to be operated in a heating or a cooling mode.

Another object of this invention is to provide a novel method for insulating the roof line of a structure.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a solar efficient structure such as a house which maintains a comfortable living environment therein throughout all seasons of the year. More particularly, the solar efficient structure comprises a plurality of ducts positioned beneath the slab of the house in thermal contact with the ground. The ducts interconnect the various rooms of the house with a central chase. The other end of the chase is then connected in fluid communication with the attic of the house. A plurality of vents are positioned within the ceiling so as to permit airflow between the attic, acting as a plenum, and the various rooms of the house. A fan means is provided for circulating the air through the ducts, the chase, the attic, and the rooms.

In one embodiment, the fan means is reversible such that the air may be circulated in one direction or another. Specifically, when operating in a cooling mode, the fan is operated to circulate air from the ducts through the chase into the attic. The air then flows from the attic into the various rooms of the house to return to the duct means. Conversely, when operating in a heating mode, the fan means is operated to circulate air from the attic through the chase into the ducts. The air then flows through the various rooms of the structure to the attic to return to the chase. It should be appreciated that the air circulating through the ducts is warmed (or cooled) to the temperature of the ground, which remains at the relatively constant temperature of 72° F. A dehumidifier, air conditioner, or heat pump may be provided to dehumidify, cool or heat the circulating airflow.

In an improved embodiment, a plurality of perforated ducts are connected in fluid communication with the central chase and respectively extend through the attic into the various rooms of the structure. The porosity of the ducts is selected such that a certain volume of air is permitted to escape through the perforations of the duct into the attic to maintain a cool temperature in the attic. This assures that the ceiling of the rooms of the structure will remain cool and therefore provide a cool radiant surface. Simultaneously, the remaining airflow not escaping from the duct into the attic is forced into the various rooms of the structure. This permits a smaller fan having a smaller cubic feet per minute output to be installed while, at the same time, assuring that sufficient airflow is directed into the various rooms of the structure.

In another embodiment of the invention, a greenhouse room is provided for permitting solar energy to assist in the heating of the circulating airflow. Specifically, the walls and the ceiling of the greenhouse room are transparent, to permit ultraviolet radiation to enter and heat the air contained therein. A damper is provided for controlling the airflow through the greenhouse in such a manner that airflow is prevented from flowing through the greenhouse when the damper is moved to a cool position, hereinafter defined as the cooling mode. Conversely, at least a portion of the airflow is permitted to flow through the greenhouse when the damper is moved to a heat position, hereinafter defined as the heating mode.

The invention also lies in the novel method for insulating the roof line of the house, which allows the attic to act as a plenum, as described above. More particularly, the construction method comprises the steps of draping a sheet of flexible material such as plastic over the trusses of the roof to form "pockets" between adjoining trusses. The flexible material is then fastened to the cross member of the trusses by a tack strip or the like. The pockets are then filled with loose insulation by conventional "blow-in" techniques.

Finally, the walls and the roof of the house include a vent skin which reduces the amount of thermal energy which is permitted to conduct into the wall structure, or the roof. The vent skin comprises a sheet of insulation affixed to the outside surface of the wall (or the roof) and a sheet of material in juxtaposition with the sheet of insulation to define an air space therebetween. Vents are then positioned at the bottom and at the top of the sheet of material to permit thermosyphon airflow upward through the air space.

The foregoing has outlined rather broadly the more pertinent and important features of the present invention in order that the detailed description of the invention that follows may be better understood so that the present contribution to the arts can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and object of the invention, reference should be had to the following detailed description taken in connection with the accompanying drawings in which:

FIG. 6 is a modification of FIG. 4 illustrating the new improvement of the invention.

Similar reference characters refer to similar parts throughout the several views of the drawings.

DETAILED DESCRIPTION OF THE PREFERRED EMBODIMENT

Figure 1:
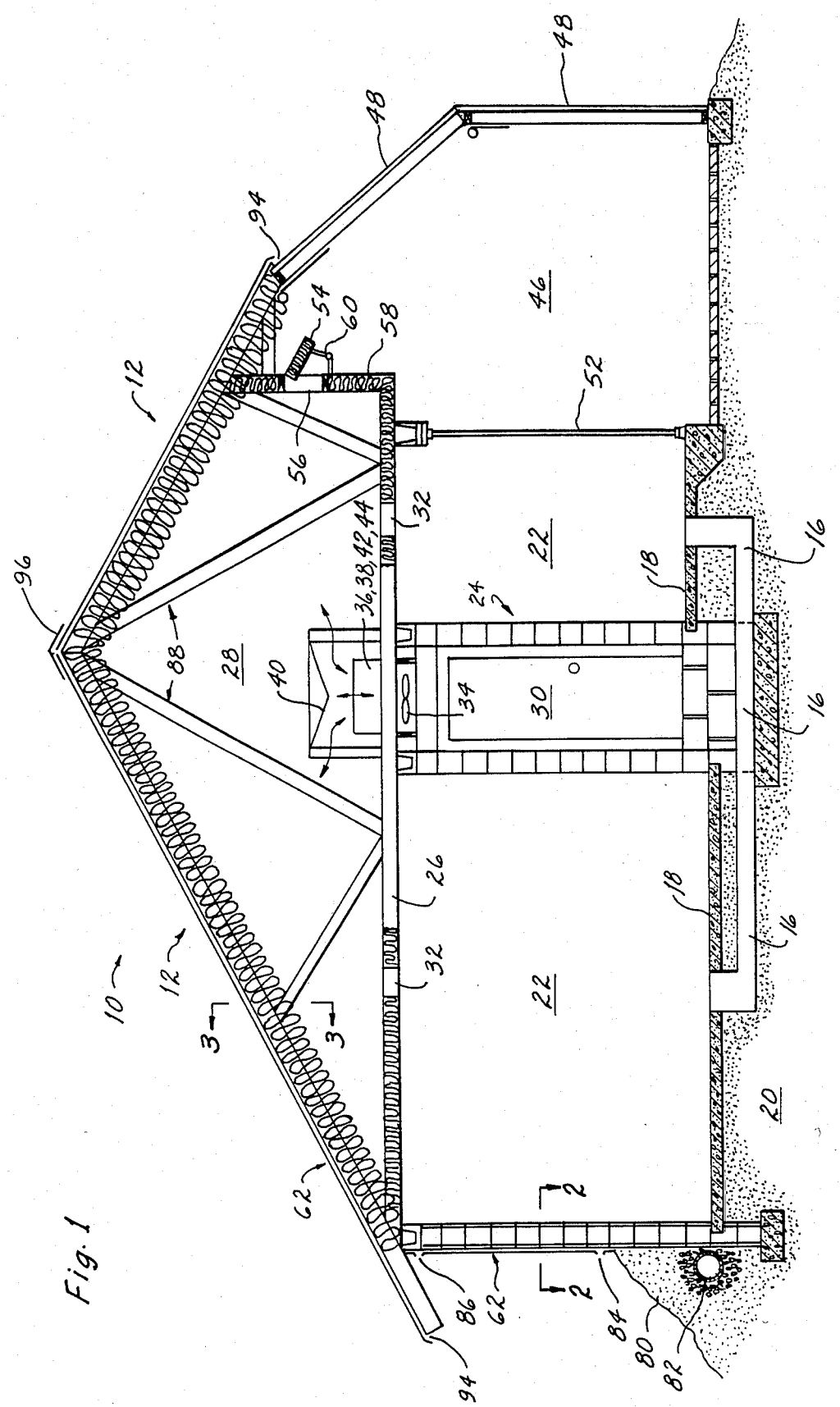
FIG. 1 is a cross-sectional view of the solar efficient structure of the invention illustrating the centrally located chase therein.

FIG. 1 is a cross-sectional view of the solar efficient structure 10 of the invention including a roof 12 and a plurality of outside, weightbearing walls 14. More particularly, a network of ducts 16 is positioned underneath the slab 18 of the structure 10 in thermal contact with the ground 20. One end of the ducts 16 leads into the various rooms 22 of the structure 10. The other end of the duct 16 is connected in fluid communication with a vertical chase 24. The chase 24 is substantially rectangular in cross section and extends from the ducts 16 through the ceiling 26 into the attic 28. An airtight door 30 is provided to permit access to the interior of the chase 24. A plurality of vents 32 are positioned through the ceiling 26. A reversible fan 34, preferably mounted in the upper portion of the chase 24, is provided for creating an airflow within the structure 10.

When operating in the cooling mode, the fan means 34 is operated to circulate air from the ducts 16, through the chase 24 into the attic 28, and then into the rooms 22 to return to the ducts 16, hereinafter defined as the cool direction. Conversely, when operating in the heating mode, the fan 34 is operated to circulate air from the attic 28 through the chase 24 to the ducts 16, and then through the rooms 22 to return to the attic 28 via vents 32, hereinafter defined as the heat direction. It should be appreciated that the airflow circulating through the ducts 16 will be maintained at substantially the temperature of the ground 20 beneath the structure 10. Inasmuch as the temperature of the ground 20 will remain relatively constant at 72° F. throughout the seasons of the year, it is seen that the temperature of the circulating air will also remain at a comfortable, 72° F.

It is noted that during severe cold or severe heat, the tempering effects of the ground 20 may not be sufficient to maintain a comfortable temperature within the structure 10. Accordingly, it may be desirable to incorporate additional means for either heating or cooling the circulating airflow. More particularly, the cooling means may comprise an air conditioner 36 or a dehumidifier 38 positioned in the upper portion of the chase 24. An inverted pyramidal diffuser 40 may be provided at the output of the air conditioner 36 (or dehumidifier 38) so as to force the airflow to be equally disbursed throughout the attic 28. The heating means may comprise a heat pump 42 or a resistive heating strip 44 which is similarly positioned in the upper portion of the chase 24. Alternatively, the heating means may include a greenhouse room 46.

The greenhouse room 46 comprises transparent walls 48 and roof 50 which permit ultraviolet radiation to pass therethrough and heat the air contained therein. A set of sliding glass doors 52 divides the greenhouse room 46 from the adjoining room 22. A damper 54 is operatively connected across an opening 56 in the gable 58 which divides the upper portion of the greenhouse room 46 and the attic 28. When operating in a heating mode, the sliding glass doors 52 are opened and the damper 54 is moved to an open, heat position to permit at least a portion of the airflow flowing through the adjoining room 22 to flow through the greenhouse room 46 to return to the attic 28 via the opening 56. Conversely, when operating in a cooling mode, the damper 54 is moved to a closed, cool position and the sliding glass doors 52 are closed, thereby isolating the greenhouse room 46 from the remainder of the structure 10.

It is noted that the openness of the damper 54 determines the amount of airflow which is permitted to flow through the greenhouse room 46. An automatic opening device 60 may be provided so as to open the damper 54 in response to the temperature of the air contained in the greenhouse room 46. Preferably, the device comprises the one sold under the trademark "Thermofor" by Bramen Company, Inc. located in Salem, Mass. The Thermofor device operates by automatically adjusting the openness of the damper 54 to correspond to the temperature of the air contained within the greenhouse room 46.

Figure 2:
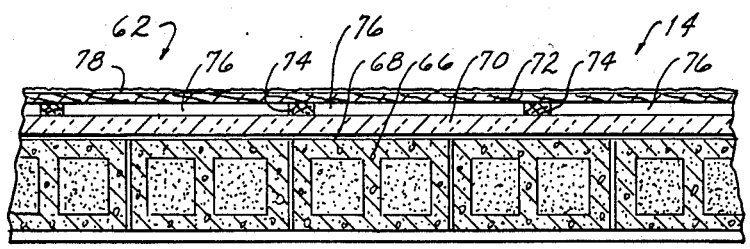
FIG. 2 is a cross-sectional view of FIG. 1 along lines 2—2 showing the vent skin positioned about the walls of the stucture.

The walls 14 and the roof 12 of the structure 10 are fully insulated to reduce thermal heat flow therethrough. This is accomplished by incorporation of a vent skin 62 about the outside surface of the walls 14 and the roof 12. As shown in FIG. 2, the vent skin 62 positioned about the exterior surfaces of the walls 14 comprises a polyurethane seal 68 applied to the exterior surface of the concrete block 66 constituting the wall 14. A sheet of insulation 70, preferably the insulation board sold under the trademark "Thermax" by the Celotex Corporation of Tampa, Fla. or the insulation board sold under the trademark "Styrofoam" by Dow Chemical Company of Midland, Mich., is glued to the polyurethane seal 68 of the wall 14. A sheet of material 72 such as plywood is rigidly connected in juxtaposition with the sheet of insulation 70 by means of a plurality of furrings 74 to create an air space 76 therebetween. The outer surface of the plywood 72 is then surfaced with texcrete or the like. Referring again to FIG. 1, a berm 80 is built up against the wall 14 a distance of approximately three feet. A drain 82 is positioned at the bottom of the berm 80 to drain away any excess moisture within the berm 80. A pair of vents 84 and 86 are connected through the sheet of material 72 and the texcrete 78 at the bottom and at the top of the wall 14. The vents 84 and 86 permit thermosyphon airflow upward within the air space 76.

The vent skin 62 positioned about the roof 12 comprises a similar structure. Specifically, the sheet of insulation 70 is nailed to the trusses 88 defining the contour of the roof 12. The sheet of plywood 72 is then nailed in juxtaposition to the sheet of insulation 70 by means of a plurality of furrings 74 to define an air space 76 therebetween. Sheets of felt 90 are nailed to the exterior of the plywood 72. Shingles 92 are then installed on the outside of the felt 90. Referring again to FIG. 1, it is seen that a vent 94 is positioned at the bottom end of the roof 12. A ridge vent 96 is then connected about the ridge line of the roof 12. The ridge vent 96 comprises a dome shaped configuration which is in juxtaposition with the upper end of the air space 76. The vents 94 and 96 permit thermosyphon airflow upward through the air space 76 along the entire length of the roof 12.

Figure 3:
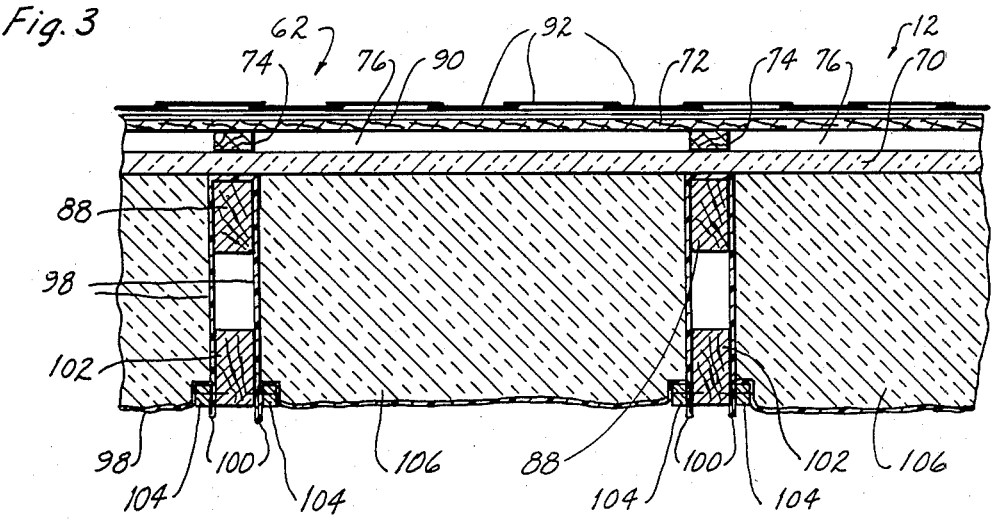
FIG. 3 is a cross-sectional view of FIG. 1 along lines 3—3 illustrating the vent skin positioned along the roof lines of the structure and illustrating the method of insulating the roof from the outside environment.

The subject invention also comprises a novel method for insulating the roof 12 of the structure 10. More particularly, as shown in FIG. 3, the roof 12 is insulated by draping a sheet of flexible material 98 such as plastic over the trusses 88. The flexible material 98 is loosely draped such that it folds downwardly between adjoining trusses 88 to form a "pocket" therebetween. The flexible material 98 is gathered and folded at fold 100, and then secured to the cross members 102 of the trusses 88 by means of a tack strip 104. The tack strips 104 extend along the length of each truss 88 to interconnect the cross members 102 thereof. The flexible material 98 is additonally secured to the portion of the tack strip 104 which spans the distance between the cross members 102, by stapling the folded flexible material 98 to the tack strip 104. After the pockets are formed between adjoining trusses 88, an opening is cut into the material 98 permitting loose insulation 106 to be blown therein. The opening is then taped shut by means of duct tape or the like. The roofing material such as the sheet of insulation 70, sheet of material 72, shingles 92, etc. are then connected to the trusses 88 in the manner described above. It should be appreciated that the above method provides a convenient means for insulating the roof 12 of the structure 10. It shall be understood that the method may be applied to virtually any type of roof or wall structure, whether at an angle, or in vertical or horizontal plane.

Figure 4:
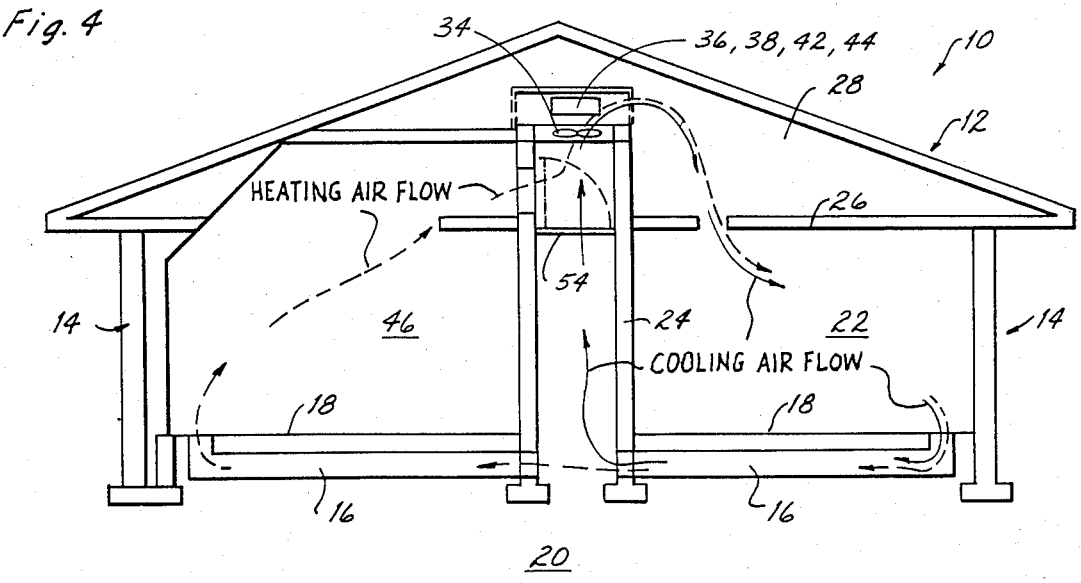
FIG. 4 is a schematic representation of a second embodiment of the solar efficient structure of the invention.

FIG. 4 illustrates another embodiment of the structure 10 in which the ducts 16 enter into the greenhouse room 46 and in which the damper 54 is positioned within the chase 24. During operation, with the chase 24 in the heat position as shown in FIG. 4, the fan 34 is operated to circulate the air from the duct 16, through the greenhouse room 46, through the chase 24, through the attic 28, and into the various rooms 22 of the house to return to the duct 16. Conversely, when the damper 54 is in a cool position as shown in phantom in FIG. 4, the air is prevented from circulating through the greenhouse room 46, and merely circulates through the duct 16, the chase 24, and the attic 28 to return to the rooms 22. It should be appreciated that the fan 34 in this other embodiment of the structure 10 need only be operable in one direction.

Figure 5:
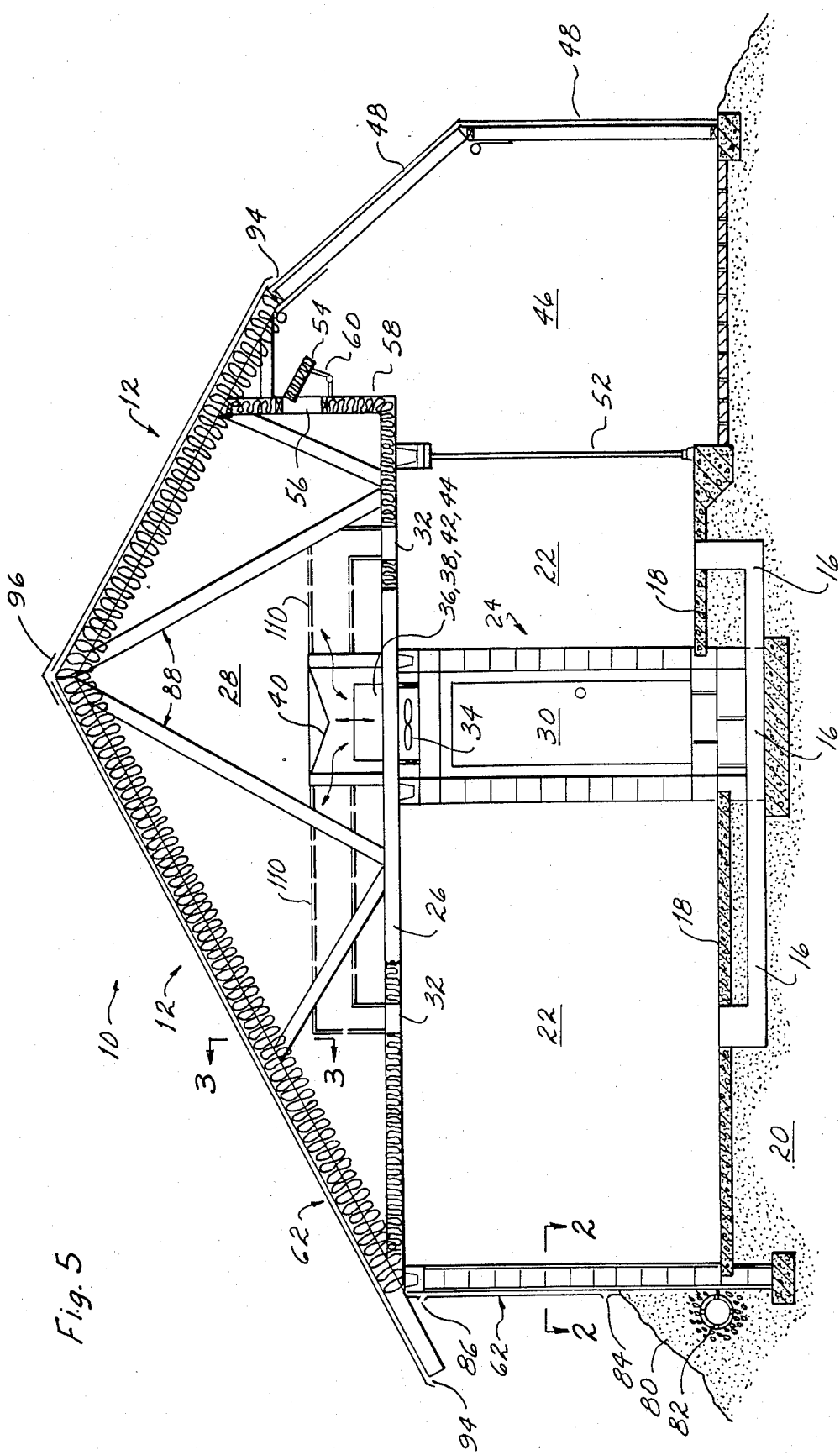
FIG. 5 is a modification of FIG. 1 illustrating the new improvement of the invention.

Referring to FIGS. 5 and 6, the improved embodiment of the solar efficient structure comprises the addition of a perforated duct 110 between the output of the chase 24 and the vents 32 positioned in the various rooms 22 of the structure 10. The porosity of the perforated duct 110 is selected such that a certain amount of the airflow to or from the output of the chase 24 is permitted to escape from the duct 110 into the attic plenum 28, the exact amount of air escaping being sufficient to maintain the temperature within the plenum attic 28 to approximately 72°. With the plenum attic 28 being maintained at a comfortable temperature, the ceiling 26 is maintained as a cool radiant surface, thereby assisting in the maintenance of a comfortable temperature within the various rooms 22 of the house of the structure 10. Simultaneously, the remaining portion of the airflow which has not escaped through the perforations in the duct 110 is forced through the duct 110 directly into various rooms 22 of the structure 10. This reduces the cubic foot per minute requirements of the fan 34 necessary to create the circulation through the ducts 16 located underneath the slab 18 of the structure 10.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A solar efficient structure including an attic and a ceiling operable to cool one or more rooms thereof, comprising in combination:
   insulation means for thermally insulating the attic from the environment outside of the structure;
   a chase;
   first duct means positioned in thermal contact with the ground;
   said first duct means being connected in fluid communication with at least one room of the structure and said chase;
   perforated attic duct means connected in fluid communication with the room of the structure and the said chase;
   fan means positioned to circulate air from said first duct means, through said chase, through said perforated attic duct means and into the room of the structure to return to said first duct means; and
   said perforated attic duct means including a porosity sufficient to maintain the temperature within the attic to approximately equal to the temperature of the ground to assure that the ceiling functions as a radiant surface at a temperature approximately equal to the temperature of the ground.

2. The solar efficient structure as set forth in claim 1, wherein said chase is positioned within the structure and wherein said fan means is positioned within said chase.

3. The solar efficient structure as set forth in claim 1, further including means for cooling the circulating airflow.

4. The solar efficient structure as set forth in claim 1, further including a means for dehumidifying the circulating airflow.

5. The solar efficient structure as set forth in claim 1, further including a vent skin positioned about the outside surface of the structure to reduce the amount of heat transfer between the outside environment and the interior of the structure.

6. The solar efficient structure as set forth in claim 5, wherein said vent skin connected about the wall portions of the structure comprises in combination:
   a sheet of insulation affixed to the outside surface of the wall;
   a sheet of material in juxtaposition with said sheet of insulation to define an air space therebetween; and
   a vent positioned at the bottom and at the top of said sheet of material to permit thermosyphon airflow upward through said air space.

7. A solar efficient structure as set forth in claim 6, wherein said vent skin connected about the roof of the structure comprises in combination:
   a sheet of insulation affixed to the trusses of the roof of said structure;
   a sheet of material in juxtaposition with said sheet of insulation to define an air space therebetween; and
   a vent positioned at the bottom of said sheet of material and a ridge vent positioned at the top of said sheet of material to permit thermosyphon airflow upward through said air space.

8. The solar efficient structure as set forth in claim 7, further including means for insulating the roof of the structure.

9. The solar efficient structure as set forth in claim 8, wherein said insulation means comprises in combination:
   a sheet of flexible material draped over adjoining trusses of the roof to define pockets therebetween;
   means for affixing said sheet of flexible material to the cross members of the trusses; and
   said pockets being filled with loose insulation.

10. A solar efficient structure including an attic and a ceiling operable in a heat mode and a cool mode to heat or cool one or more rooms thereof, comprising in combination:
    insulation means for thermally insulating the attic from the environment outside of the structure;
    a chase;
    first duct means positioned in thermal contact with the ground;
    said first duct means being connected in fluid communication with at least one room of the structure and said chase;
    perforated attic duct means connected in fluid communication with the room of the structure and said chase;
    said perforated attic duct means including a porsity sufficient to maintain the temperature within the attic to approximately equal to the temperature of the ground to assure that the ceiling functions as a radiant surface at a temperature approximately equal to the temperature of the ground; and
    fan means positioned to circulate airflow through said first duct means, through said chase, through said perforated attic duct means and through the room of the structure.

11. The solar efficient structure as set forth in claim 10, further including means for heating the circulating airflow when operating in a heat mode.

12. The solar efficient structure as set forth in claim 11, wherein said fan means is reversible.

13. The solar efficient structure as set forth in claim 11, wherein said heating means comprises a greenhouse room enabling ultraviolet radiation to enter and heat the air contained therein, said first duct means being in fluid communication with said greenhouse room.

14. The solar efficient structure as set forth in claim 10, further including damper means positioned within said chase for controlling the direction of airflow therethrough, whereby when said damper means is moved to a heat position, said fan means circulates air from said greenhouse room through said chase into the other room of the structure and then through said first duct means to return to said greenhouse room, and whereby, when said damper means is moved to a cool position, said fan means circulates air from said first duct means through said chase into the other room of the structure to return to said first duct means.

15. The solar efficient structure as set forth in claim 14, wherein said chase is positioned vertically with respect to the structure, said chase including a cooling input connected in fluid communication with said first duct means and a heat input connected in fluid communication with said greenhouse room, and the output being connected in fluid communication with said perforated attic duct means, said damper means positioned within said chase being operable to close either said cool input or said heat input of said chase.

16. The solar efficient structure as set forth in claim 15, wherein said fan means is reversible, whereby, when said damper means is moved to a heat position, said fan means operates in a heating direction to circulate at least a portion of the air from said greenhouse room, through said first duct means into the other room of the structure to return to said greenhouse room, and whereby, when said damper means is moved to a cool position, said fan means operates in a cooling direction to circulate air from the other room of the structure, through said first duct means into said chase to return to the other room of the structure.

17. The solar efficient structure as set forth in claim 10, further including a dehumidifier for dehumidifying the circulating air.

18. The solar efficient structure as set forth in claim 10, further including air conditioning means for cooling the circulating air.

19. The solar efficient structure as set forth in claim 10, further including heating means for heating the circulating air.

20. The solar efficient structure as set forth in claim 10, further including a vent skin positioned about the outside surface of the structure to reduce the amount of heat transfer between the outside environment and the interior of the structure.

21. The solar efficient structure as set forth in claim 20, wherein said vent skin connected about the wall portions of the structure comprises in combination:
a sheet of insulation affixed to the outside surface of the wall;
a sheet of material in juxtaposition with said sheet of insulation to define an air space therebetween; and
a vent positioned at the bottom and at the top of said sheet of material to permit thermosyphon airflow upward through said air space.

22. The solar efficient structure as set forth in claim 20, wherein said vent skin connected about the roof of the structure comprises in combination:
a sheet of insulation affixed to the trusses of said structure;
a sheet of material in juxtaposition with said sheet of insulation to define an air space therebetween; and
a vent positioned at the bottom of said sheet of material and a ridge vent positioned at the top of said sheet of material to permit thermosyphon airflow upward through said air space.

23. The solar efficient structure as set forth in claim 10 further including means for insulating the roof of the structure.

24. The solar efficient structure as set forth in claim 23, wherein said insulation means comprises in combination:
a sheet of flexible material draped over adjoining trusses of the roof to define pockets therebetween;
means for affixing said sheet of material to the cross members of the trusses; and
said pockets being filled with loose insulation.

* * * * *